United States Patent
Seyedi

(10) Patent No.: US 11,533,110 B1
(45) Date of Patent: Dec. 20, 2022

(54) TRANSMITTING AN OPTICAL SIGNAL INCLUDING HETERODYNE COMBINATIONS

(71) Applicant: Hewlett Packard Enterprise Development LP, Houston, TX (US)

(72) Inventor: Mir Ashkan Seyedi, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/443,960

(22) Filed: Jul. 29, 2021

(51) Int. Cl.
| H04B 10/64 | (2013.01) |
| H04B 10/61 | (2013.01) |
| H04B 10/40 | (2013.01) |

(52) U.S. Cl.
CPC ............ H04B 10/64 (2013.01); H04B 10/40 (2013.01); H04B 10/615 (2013.01)

(58) Field of Classification Search
CPC ....... H04B 10/40; H04B 10/64; H04B 10/615
USPC ........................................................ 398/138
See application file for complete search history.

(56) References Cited

U.S. PATENT DOCUMENTS

| 3,573,463 | A | 4/1971 | Goodwin et al. |
| 7,012,696 | B2 | 3/2006 | Orr et al. |
| 7,991,289 | B2 | 8/2011 | Hill et al. |
| 8,693,881 | B2 | 4/2014 | Wu et al. |
| 9,008,212 | B2 | 4/2015 | Lovberg et al. |
| 10,754,091 | B1* | 8/2020 | Nagarajan ............... G02B 6/428 |
| 10,944,482 | B2* | 3/2021 | Younce ................ H04B 10/614 |
| 2016/0028426 | A1 | 1/2016 | Plevel |
| 2016/0285581 | A1* | 9/2016 | Mickelson ........... H04B 10/671 |
| 2021/0088740 | A1* | 3/2021 | Liang ..................... H04B 10/67 |

OTHER PUBLICATIONS

Hanay, O., et al.; "Digital centric IF-DAC based heterodyne transmitter architecture"; Dec. 1, 2017; 2 pages.
Yamada, H., et al.; "Optical Directional Coupler Based on Si-Wire Waveguides"; Mar. 3, 2005; 3 pages.

* cited by examiner

*Primary Examiner* — Dalzid E Singh
(74) *Attorney, Agent, or Firm* — Hewlett Packard Enterprise Patent Department

(57) ABSTRACT

Examples relate to a transmitter for transmitting an optical signal including multiple frequencies. The transmitter includes a waveguide to receive a multi-frequency optical signal and a plurality of resonators coupled to the waveguide. Each resonator of the plurality of resonators selectively filters an optical signal of a frequency from the multi-frequency optical signal. The transmitter includes an optical combiner coupled to the plurality of resonators to receive optical signals filtered by the plurality of resonators and generate an output optical signal including a heterodyne combination based on the optical signals received from the plurality of resonators.

17 Claims, 4 Drawing Sheets

TRANSMITTING AN OPTICAL SIGNAL INCLUDING HETERODYNE COMBINATIONS

BACKGROUND

In an optical communications system, a transmitter transmits data in the form of optical signals to a receiver over a communication medium. Data is transmitted from the transmitter to a receiver using serial data transmission or parallel data transmission. In serial data transmission, data bits are transmitted one after another over a single communication link and in parallel data transmission, multiple data bits are transmitted over multiple communications links simultaneously.

BRIEF DESCRIPTION OF THE DRAWINGS

Various examples will be described below with references to the following figures.

Figure 1A:
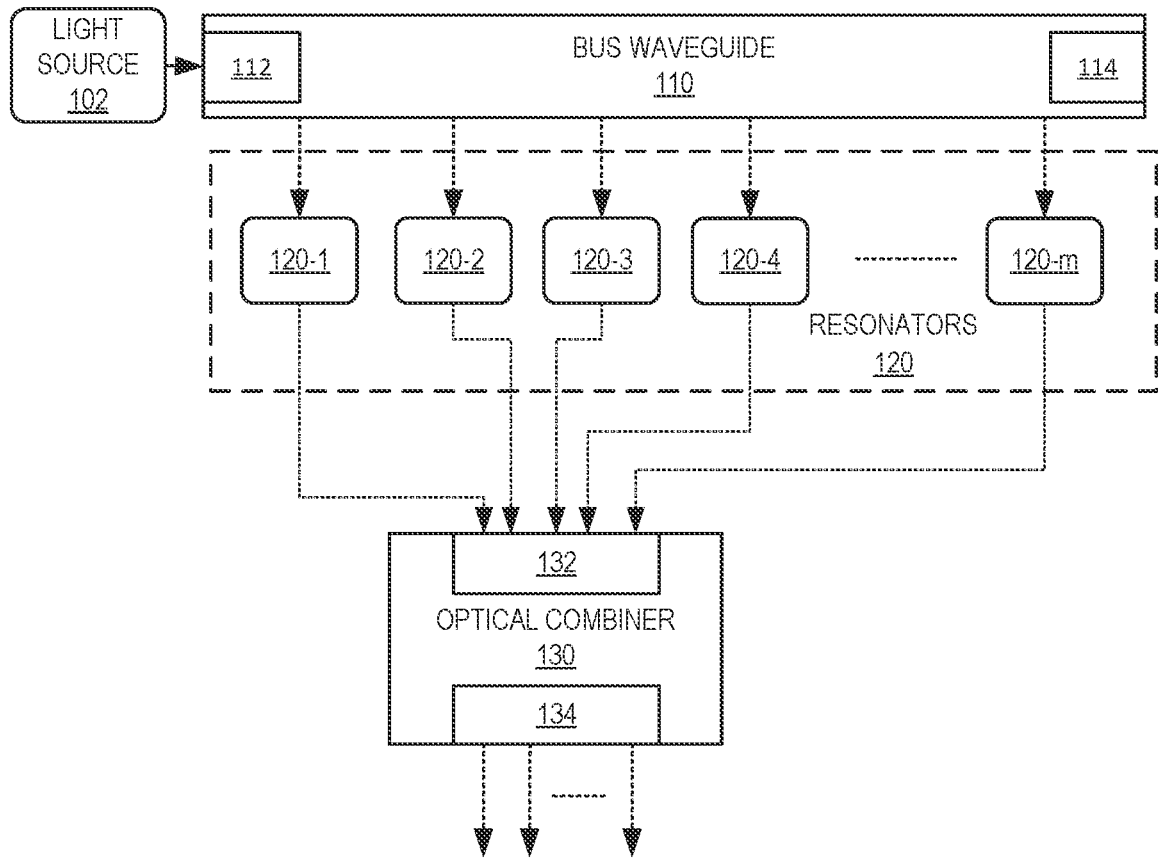
FIG. 1A is a block diagram of a transmitter, in accordance with an example.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

An optical communication system generally includes a transmitter and a receiver coupled to each other via a communication medium (e.g., an optical fiber, waveguide, or the like). At the transmitter, an electrical signal including data generally modulates an optical carrier signal using a modulator to form a resulting optical signal including a modulated optical signal. The modulator may modulate the optical carrier signal using a data encoding scheme such as Non-Return to Zero (NRZ), Pulse-Amplitude Modulation (PAM), and Quadrature Phase Shift Keying (QPSK). The transmitter may process (e.g. amplify) the modulated optical signal and transmit it to the receiver. At the receiver, the modulated optical signal is demodulated using a demodulator and converted to an electrical signal. In addition to the modulator and demodulator, the transmitter and the receiver may include other electronic devices such as digital signal processing (DSP) modules, clock data recovery (CDR), slicers, encodes, etc.

The electronic devices present in optical communication systems have a number of limitations while interfacing with optical components that prevent the full potential of optical communication and computing from being realized. For example, the electronic devices cannot directly process optical signals. Further, optical signals have frequencies in the terahertz while the electronic devices typically operate in the kilohertz to gigahertz range. In order to process the optical signals, the optical signals are first converted into electrical signals. Consequently, the electronic devices limit the speed, data rates, and processing in the system and contribute to latency. Moreover, these electronic devices may contribute to complexity and cost for manufacturing and also the consumption of a significant amount of power.

Examples described herein provide techniques for transmitting optical signals without using modulation. In particular, the techniques enable the transmission of optical signals (e.g., with encoded data) without the use of modulators and other complex circuitry. The described techniques use a heterodyning technique for combining optical signals of two different frequencies and generate an optical signal including a new frequency (e.g., a heterodyne combination of the two frequencies). In some examples, the techniques may generate an optical signal including multiple new frequencies. Transmission of such optical signal may allow to send multiple bits in parallel and hence enable parallel data transmission. For example, in situations where the techniques generate an optical signal including 32 frequencies, the techniques may communicate 32-bit words in parallel.

In some examples, a transmitter may include a waveguide to receive a multi-frequency optical signal and a plurality of resonators coupled to the waveguide. Each resonator of the plurality of resonators may selectively filter an optical signal of a frequency from the multi-frequency optical signal. The transmitter may include an optical combiner coupled to the plurality of resonators to receive optical signals filtered by the plurality of resonators and generate an output optical signal including a heterodyne combination based on the optical signals received from the plurality of resonators. In some examples, the optical combiner may generate an optical signal including multiple heterodyne combinations based on the optical signals received from the plurality of resonators. In some examples, the transmitter may include a first controller to tune the resonators to filter the optical signals of multiple frequencies to generate an output optical signal encoded with data to be transmitted.

In some examples, an optical communication system may include a transmitter and a receiver optically coupled to each other. The transmitter may include a waveguide to receive a multi-frequency optical signal and a plurality of resonators coupled to the waveguide. Each resonator of the plurality of resonators may selectively filter an optical signal of a frequency from the multi-frequency optical signal. The transmitter may include an optical combiner coupled to the plurality of resonators to receive optical signals filtered by the plurality of resonators and generate an output optical signal including heterodyne combinations based on the optical signals received from the plurality of resonators. The receiver may include a photodetector to receive the output optical signal and generate an electrical signal including the heterodyne combinations and an electronic circuit to receive the electrical from the photodetector and generate electrical signals, each including a heterodyne combination of the heterodyne combinations.

In some examples, a method includes receiving, by a transmitter, data to be transmitted. In response to receiving the data, the method includes tuning, by the transmitter, a plurality of resonators to selectively filter, from each of the resonators, an optical signal of a frequency from a multi-frequency optical signal, and generating an output optical signal including heterodyne combinations based on the optical signals received from the plurality of resonators Examples are further described herein with reference to FIGS. 1A-1B, 2A-2B, 3, and 4. It should be noted that the description and figures merely illustrate the principles of the present subject matter along with examples described herein, and should not be construed as limiting the present subject matter. Any functionality described herein as performed by a component (e.g., a controller) of an optical communication system may be performed by at least one processing resource of the component executing instructions (stored on a machine-readable storage medium) to perform the functionalities described herein. Various implementations of the present subject matter have been described below by referring to several examples.

FIG. 1A is a block diagram depicting a transmitter 100, according to an example. The transmitter 100 may be a transmitting part of a transceiver module or a standalone optical transmitter. The term "transmitter" as used herein may refer to a stand-alone optical transmitter or a transmitting part of a transceiver module. The transmitter 100 may include a waveguide 110 (e.g., bus waveguide), a plurality of resonators 120-1, 120-2, . . . 120-m (collectively referred to as 'resonators 120') that may optically couple with the bus waveguide 110 and an optical combiner 130 optically coupled to the resonators 120. The bus waveguide 110 and the resonators 120 may be made of a material with a refractive index different from that of a surrounding material. In some examples, the resonators 120 may be made of different materials.

In some examples, the bus waveguide 110 may be a linear waveguide. The bus waveguide 110 may include an input port 112 and an output port 114. The bus waveguide 110 may be optically coupled to a light source 102 at the input port 112. The input port 112 of the bus waveguide 110 may receive the multi-frequency optical signal emitted from the light source 102. The light source 102 may be a part of the transmitter 100 or may be external to the transmitter 100. The multi-frequency optical signal may include an optical spectrum of multiple frequencies. In an example, the light source 102 may include an optical comb source. The optical comb source may refer to a laser source that emits a laser beam of an optical spectrum including a series of discrete frequencies. For example, the optical spectrum of the optical comb source may include a series of 'n' frequencies $f_1$, $f_2, \ldots f_n$ (where n is an integer) with a frequency spacing of $\Delta f$. The frequencies of the optical spectrum may be represented using equation 1 as follows:

$$fn-f1=(n-1)\Delta f \qquad \text{Equation 1}$$

Each resonator 120 may include a closed loop (e.g., circular) waveguide. The circular waveguides may be located in close proximity to the bus waveguide 110 in order to optically couple with the bus waveguide 110. Further, each resonator 120 may include an output waveguide situated parallel to the bus waveguide 110. In each resonator 120, its circular waveguide is placed between the bus waveguide 110 and the output waveguide to form a ring resonator. The input port 112 of the bus waveguide 110 may act as input port and the output port 114 of the bus waveguide 110 may act as a pass-through port for each resonator 120. The output waveguide of each resonator 120 may include an output port at one of the ends, which serves as a drop port.

In situations where the multi-frequency optical signal is received at the input port 112 and transmitted through the bus waveguide 110, a given resonator 120 via its circular waveguide may optically couple an optical signal of a given frequency (e.g., resonant frequency of its circular waveguide), which depends on a material, dimension, or temperature, etc. of its circular waveguide. The optical signal may rotate clockwise or counter-clockwise in the circular waveguide depending on the physical location of the input port 112 and travel to the drop port of the given resonator 120. In this manner, the given resonator 120 may filter the optical signal of the given frequency.

In some examples, each of the resonators 120 may be configured to optically couple an optical signal of a certain frequency. The resonators 120 may couple optical signals of respective frequencies by altering their materials, dimensions, temperatures, or the like. In this manner, the resonators 120 may filter, individually, optical signals of different frequencies. For example, the resonator 120-1 may filter an optical signal of a frequency '$f_1$', the resonator 120-2 may filter an optical signal of a frequency '$f_2$', and so on.

Further, the resonators 120 may be configured to selectively filter the respective optical signals. As used herein, the term "selectively filter' may mean that a given resonator 120 may be tuned to filter or not to filter the optical signal of the corresponding frequency. In particular, the given resonator 120 may be tuned to couple or not to couple the optical signal of the corresponding frequency by varying the temperature of the given resonator 120. As a temperature variation can cause a thermal shift in the resonant frequency of the given resonator 120, the given resonator 120 may be tuned to couple the optical signal of the corresponding frequency by setting a temperature of the given resonator 120 at a certain value. In some examples where the temperature of the given resonator 120 is set at the certain value, the given resonator 120 may filter the optical signal of the corresponding frequency. In some examples where the temperature of the given resonator 120 is set at another value, the given resonator 120 may not couple the optical signal of the corresponding frequency and hence may not filter the optical signal of the corresponding frequency. For example, the resonator 120-1 may be tuned to filter the optical signal of frequency f1 or not to filter the optical signals of frequency f1 by varying the temperature of the resonator 120-1. It should be understood that in situations where any resonator 120 is tuned not to filter an optical signal, the optical signal may be transmitted to the pass-through port of the bus waveguide 110. In some examples, each resonator 120 may be, individually, tuned to selectively filter the optical signal of a certain frequency. In this manner, the resonators 120 may selectively filter the optical signals of different frequencies to their respective drop ports. In the examples described herein, at least two resonators 120 may be configured to filter the optical signals of respective frequencies.

The optical combiner 130 may receive the filtered optical signals from the resonators 120 at an input port 132 of the optical combiner 130. The optical combiner 130 may include an optical directional coupler that combines the received optical signals through heterodyning technique and generate an output optical signal at an output port 134 of the optical combiner 130. The heterodyning technique may combine or mix two received optical signals of respective frequencies to generate optical signals of new frequencies (referred to as heterodynes or heterodyne combinations).

The new frequencies may include a sum and a difference of the two frequencies of received optical signals. In some examples, the optical directional coupler may include silicon-wire waveguides of short lengths (e.g., about 10 microns). In some examples, the optical combiner 130 may further include a filter to block the optical signal of the heterodyne combination that includes the sum of the frequencies of the two received optical signals and allow to pass the optical signal of the heterodyne combination including the difference of the frequencies of the two received optical signals in the output optical signal. Accordingly, the output optical signal may include the heterodyne combination including the difference of the frequencies of the two received optical signals.

In this manner, at least two resonators 120 may be tuned to filter the optical signals of respective frequencies in order to generate, at the output port 134 of the optical combiner 130, an output optical signal including a heterodyne combination based on the frequencies of the received optical signals from the two resonators 120. In some examples, more than two resonators 120 may be tuned to filter the optical signals of respective frequencies to generate an output optical signal including heterodyne combinations based on the frequencies of the received optical signals. For example, in situations where the optical combiner 130 receives the optical signals of frequencies f1, f2, and f4, respectively, from the resonators 120-1, the resonator 120-2, and the resonator 120-4, the optical combiner 130 may generate an output optical signal including heterodyne combinations f2-f1, f4-f1, and f4-f2. In some examples where the frequencies f1, f2, and f4 are equally spaced, the optical combiner 130 generates an output optical signal including heterodyne combinations Δf, 2Δf, and 3Δf. In this manner, the optical combiner 130 may generate an output optical signal including multiple heterodyne combinations based on the frequencies of the optical signals received from the resonators 120.

Table 1, presented below, shows example scenarios of generating an output optical signal including one or more heterodyne combinations by tuning two or more of the resonator 120-1, resonator 120-2, resonator 120-3, and resonator 120-4 for selectively filtering optical signals of respective frequencies f1, f2, f3, and f4, where the frequencies f1, f2, f3, and f4 are equally spaced. Two or more of the resonator 120-1, resonator 120-2, resonator 120-3, and resonator 120-4, may be tuned to selectively filter two or more optical signals of respective frequencies f1, f2, f3, and f4. The optical combiner 130 receives the two or more filtered optical signals and generates an output optical signal including heterodyne combination(s) based on the received optical signals. As shown in Table 1, in Scenario 1 where the resonator 120-1 and resonator 120-2 are tuned to filter the optical signals of respective frequencies f1 and f2, the optical combiner 130 generates an output optical signal including a heterodyne combination f2-f1 (i.e., Δf) and in scenario 5 where the resonator 120-1, resonator 120-2 and resonator 120-4 are tuned to filter the optical signals of respective frequencies f1, f2, and f4, the optical combiner 130 generates an output optical signal including heterodyne combinations f2-f1 (i.e., Δf), f4-f1 (i.e., 3Δf) and f4-f2 (i.e., 2Δf).

TABLE 1

Example Scenarios of generating output optical signals of heterodyne combinations

| | Resonator 120-1 | Resonator 120-2 | Resonator 120-3 | Resonator 120-4 | Output optical signal(s) |
|---|---|---|---|---|---|
| Scenario 1 | f1 | f2 | — | — | Δf |
| Scenario 2 | — | f2 | f3 | — | Δf |
| Scenario 3 | — | f2 | — | f4 | 2Δf |
| Scenario 4 | f1 | — | — | f4 | 3Δf |
| Scenario 5 | f1 | f2 | — | f4 | Δf, 2Δf, 3Δf |
| Scenario 6 | f1 | f2 | f3 | — | Δf, Δf, 2Δf |
| Scenario 7 | f1 | f2 | f3 | f4 | Δf, Δf, Δf, 2Δf, 2Δf, 3Δf |

In some examples, the output optical signal may include one or more heterodyne combinations of the same frequency. For example, in scenario 6 of Table 1, an output optical signal includes two heterodyne combinations of Δf and in scenario 7, an output optical signal includes three heterodyne combinations of Δf and two heterodyne combinations of 2Δf. Such heterodyne combinations of the same frequency (e.g., Δf) may be redundant and referred to herein as redundant heterodyne combinations.

Figure 1B:
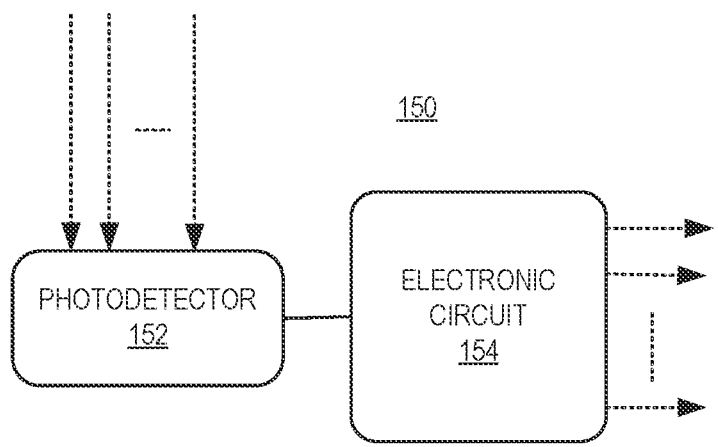
FIG. 1B is a block diagram of a receiver, in accordance with an example.

In some examples, the transmitter 100 may transmit the output optical signal including the heterodyne combination(s) generated by the optical combiner 130 to a destination, tor example, a receiver (e.g., receiver 150 of FIG. 1B). In some examples, the optical combiner 130 may manage redundant heterodyne combinations by allowing transmission of a unique heterodyne combination.

FIG. 1B is a block diagram of a receiver 150, in some examples. The receiver 150 may include a photodetector 152 and an electronic circuit 154 coupled to the photodetector 152. In situations where the receiver 150 receives an optical signal, the photodetector 152 may detect the received optical signal and upon detecting the received optical signal, convert the optical signal to an electrical signal and generate a photocurrent. In some examples, the photodetector 152 may be a photodiode. In situations where the receiver 150 receives an output optical signal including a heterodyne combination, the receiver 150 generates an electrical signal including the same heterodyne combination. In situations where the photodetector 152 receives an optical signal including multiple heterodyne combinations, the photodetector 152 may generate an electrical signal (i.e., photocurrent) including the multiple heterodyne combinations.

The electronic circuit 154 may receive the photocurrent from the photodetector 152 and, upon receiving the photocurrent, extract a DC component and an AC component of the photocurrent and generate, separately, electrical signals including the heterodyne combinations. In some examples, the electronic circuit 154 may include a filter and/or any other circuitry to separate the electrical signals, each including a heterodyne combination of the heterodyne combinations. In this manner, the receiver 150 may generate multiple electrical signals, individually, including respective heterodyne combinations. For example, in situations where the receiver 150 receives an optical signal including heterodyne combinations Δf and 2Δf, the receiver 150 generates electrical signals, individually, including the heterodyne combinations Δf and 2Δf. In some situations, the electronic circuit 154 may manage redundant heterodyne combinations by filtering a unique heterodyne combination.

In this manner, one or more examples described herein enable transmission of multiple frequencies (i.e., heterodyne combinations) in parallel. In particular, the transmitter 100 may generate an optical signal including multiple heterodyne combinations and transmit them to the receiver 150. The receiver 150 may then generate individual electrical signals including the heterodyne combinations. It will be appreciated that in order to ensure that the optical combiner 130 generates an optical signal including multiple heterodyne combinations for the transmission of multiple heterodyne combinations in parallel, the resonators 120 (see FIG. 1A) may be controlled in such a manner that the optical combiner 130 receives the optical signals filtered by the resonators 120, simultaneously.

In some examples, the transmitter 100 and the receiver 150 as described herein, may be used for parallel data transmission. In some examples, the transmitter 100 may encode an output optical signal, generated from the optical combiner 130, with data to be transmitted and transmit the output optical signal to the receiver 150. The receiver 150 may receive the output optical signal from the transmitter 100, generate an electrical signal based on the received optical signal and decode the electrical signal to recover the data.

Figure 2A:
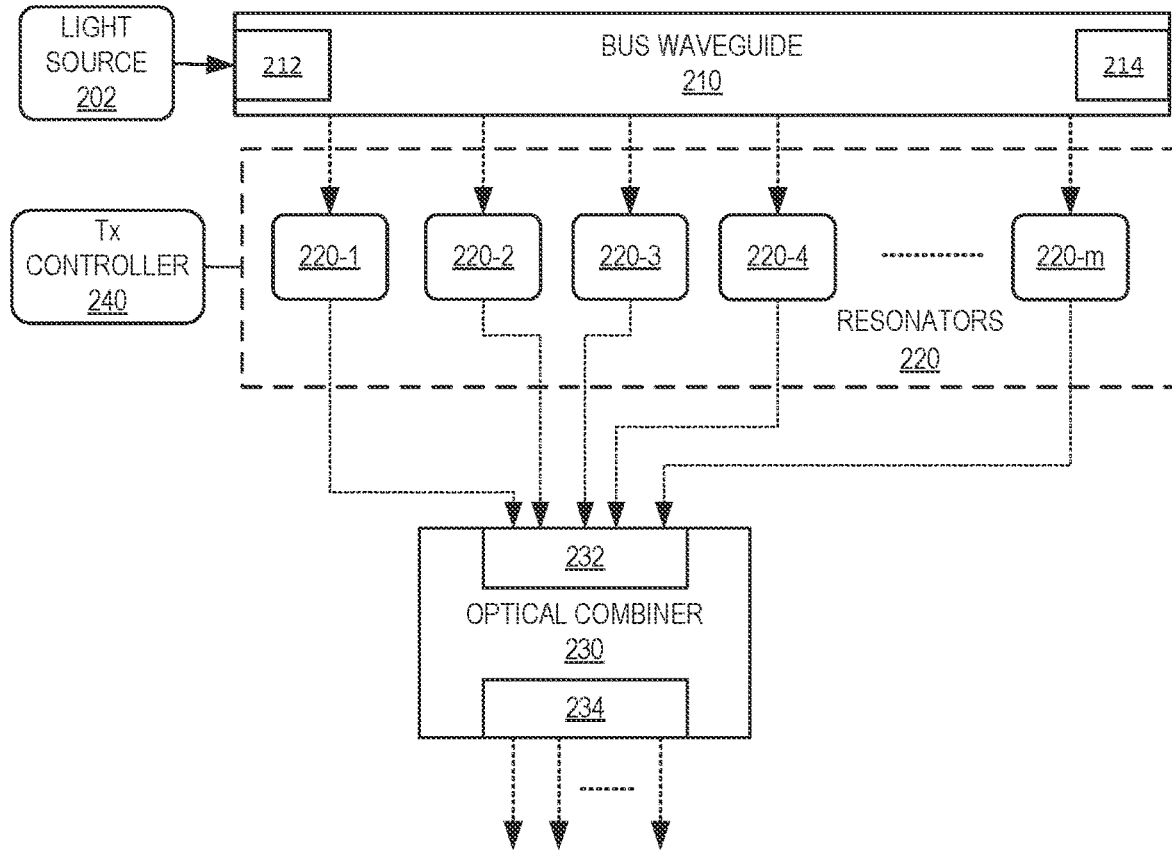
FIG. 2A is a block diagram of a transmitter, in accordance with another example.
Figure 2B:
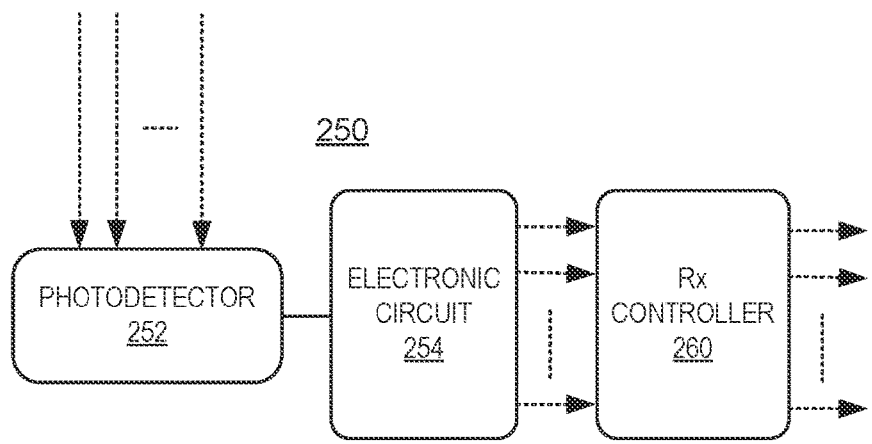
FIG. 2B is a block diagram of a receiver, in accordance with another example.

FIGS. 2A and 2B depict a transmitter 200 and a receiver 250, in some examples. The transmitter 200 depicted in FIG. 2A may be representative of one example of the transmitter 100 depicted in FIG. 1A and the receiver 250 depicted in FIG. 2B is representative of one example of the receiver 150 depicted in FIG. 1B. Accordingly, the transmitter 200 and the receiver 250 may include certain features that are similar, in one or more aspects (e.g., geometry, dimension, positioning, material, or operation), with similarly named features of the transmitter 100 and the receiver 150, respectively, description of which is not repeated herein for the sake of brevity. For example, the transmitter 200 may include a light source 202, a bus waveguide 210 including an input port 212 and an output port 214, a plurality of resonator 220-1, 220-2, . . . 220-m (collectively referred to as 'resonators 220') and an optical combiner 230 including an input port 232 and an output port 234. Further, the receiver 250 may include a photodetector 152 and an electronic circuit 254. In comparison to FIG. 1A, the transmitter 200 depicted in FIG. 2A may include a controller 240 (referred to herein as Tx controller 240) coupled to the resonators 220. In comparison to FIG. 1B, the receiver 250 depicted in FIG. 2B may include a controller 260 (referred to herein as Rx controller 260) coupled to the electronic circuit 254.

Each of the Tx controller 240 and the Rx controller 260 may be implemented using any form of hardware, software, or a combination thereof. In some examples, each of the Tx controller 240 and the Rx controller 260 may include a processing resource communicatively coupled to a machine-readable storage medium including instructions that, when executed by the processing resource, cause the Tx controller 240 or the Rx controller 260 to perform certain functions as described herein. Each processing resource may include a processor, microcontroller, Field-programmable Gate Array (FPGA), Application-specific Integrated Circuit (ASIC), or the like.

In FIG. 2A, the Tx controller 240 may be configured to encode data to be transmitted to an outgoing data stream of the transmitter 200. The outgoing data stream may include the output optical signals generated at the optical combiner 230. In some examples, the Tx controller 240 may use character encoding to represent a character (e.g., a number or alphabet) by a character code (e.g., a bit pattern) for digital representation. The Tx controller 240 may represent the presence and absence of a filtered optical signal, respectively by '1' and '0.' For example, in situations where the resonator 220-1 is tuned to filter the optical signal of frequency f1, the presence of the optical signal of frequency f1 may be represented as '1' and in situations where the resonator 220-1 is tuned not to filter the optical signal, the absence of the optical signal of frequency f1 may be represented as '0.' In this manner, the Tx controller 240 may tune the resonators 220 to represent a certain character code. For example, the Tx controller 240 tunes the resonator 220-1 and resonator 220-2 to filter the optical signals of respective frequencies f1 and f2 to represent a character code '1100.' In these examples, the transmitter 200 generates an output optical signal including heterodyne combination 'Δf.' Accordingly, the character code '1100' represents the presence of heterodyne combination 'Δf' in the output optical signal. In situations where the presence heterodyne combination 'Δf' in the output optical signal represents a character 'A', the character code '1100' represents the character 'A.'

In another example, the Tx controller 240 tunes the resonator 220-1 and resonator 220-3 to filter the optical signals of respective frequencies f1 and f3 to represent a character code '1010.' In this example, the transmitter 200 generates an output optical signal including heterodyne combination '2Δf.' In situations where the presence of heterodyne combination '2Δf' in the output optical signal represents a character 'B', the character code '1010' represents the character 'B.' In yet another example, the Tx controller 240 tunes the resonator 220-1, resonator 220-2 and resonator 220-3 to filter the optical signals of respective frequencies f1, f2 and f3 to represent a character code '1110.' In this example, the optical transmitter 200 generates an output optical signal including heterodyne combinations Δf and 2Δf. The presence of heterodyne combinations Δf and 2Δf in the output optical signal represents the characters 'A' and 'B.' Therefore, the character code '1110' represents the characters 'A' and 'B.' In this manner, the Tx controller 240 may tune the resonators 220 to generate an output optical signal including heterodyne combinations to represent a character code corresponding to a character to encode the output optical signal with data to be transmitted.

In an example, the Tx controller 240 may store encoding information including a mapping of characters and characters codes. In an example, the encoding information may include an encoding lookup table. Table 2 shows an example encoding lookup table. In Table 2, each character code represents one or more example characters. For example, the character code '1100' represents a character 'A', the character code '1010' represents a character 'B', the character code '1001' represents a character 'C', and the character code '1101' represents characters A, B, and C.

TABLE 2

Example encoding lookup table

| f1 | f2 | f3 | f4 | Heterodyne combination(s) | Example Character |
|----|----|----|----|---------------------------|-------------------|
| 1 | 1 | 0 | 0 | Δf | A |
| 1 | 0 | 1 | 0 | 2Δf | B |
| 1 | 0 | 0 | 1 | 3Δf | C |
| 1 | 1 | 1 | 0 | Δf, 2Δf | A, B |
| 1 | 1 | 0 | 1 | Δf, 2Δf, 3Δf | A, B, C |

In some examples where the Tx controller 240 receives data to be transmitted, the Tx controller 240 may use the encoding information to determine the character code corresponding to the characters of the data. Upon determining the character code, the Tx controller 240 may tune the resonators 220 in accordance with the character code to encode the outgoing data stream of the transmitter 200 with the data. For example, the Tx controller 240 may tune the resonator 220-1, resonator 220-2, and resonator 220-3 to filter the optical signals of frequencies f1, f2, and f3 to receive an output optical signal including heterodyne combinations $\Delta f$ and $2\Delta f$ to encode the outgoing data stream of the transmitter 200 with characters 'A' and 'B.'.

Referring to FIG. 2B, the Rx controller 260 may be configured to decode an incoming data stream of the receiver 250 to recover data encoded in the incoming data stream. In some examples, the incoming data stream of the receiver 250 may include the outgoing data stream of the transmitter 200. The Rx controller 260 may include decoding information including a mapping of characters and character codes similar to the encoding information stored at the Tx controller 240. In some examples, the decoding information is the same as the encoding information. For example, the Rx controller 260 may include a decoding lookup table that is the same as the encoding lookup table (e.g., Table 2). In situations where the receiver 250 receives the incoming data stream including the outgoing data stream of the transmitter 200, the receiver 250 may generate electrical signals including heterodyne combinations based on the output optical signal included in the outgoing data stream of the transmitter 200. The Rx controller 260 may be coupled to the electronic circuit 254 to receive the electrical signals including the heterodyne combinations. The Rx controller 260 may use the decoding information and decode the electrical signals to recover the data. For example, in situations where the Rx controller 260 receives electrical signals including frequencies $\Delta f$ and $2\Delta f$, the Rx controller 260 decodes the electrical signals to recover the characters 'A' and 'B' based on the decoding information.

In this manner, the techniques described herein enable devices (i.e., transmitter and receiver) to transmit data without the use of complex electronic circuitry such as modulators and demodulators, etc. The absence of these complex electronic circuitry in the devices may reduce the complexity and cost for manufacturing the devices and power consumption by the devices. In addition, the techniques provide advantages of data formatting such as PAM and QPSK without the complex electronic circuitry required to send and receive data. Moreover, the techniques enable parallel data transmission which improves the overall performance of data transmission.

Figure 3:
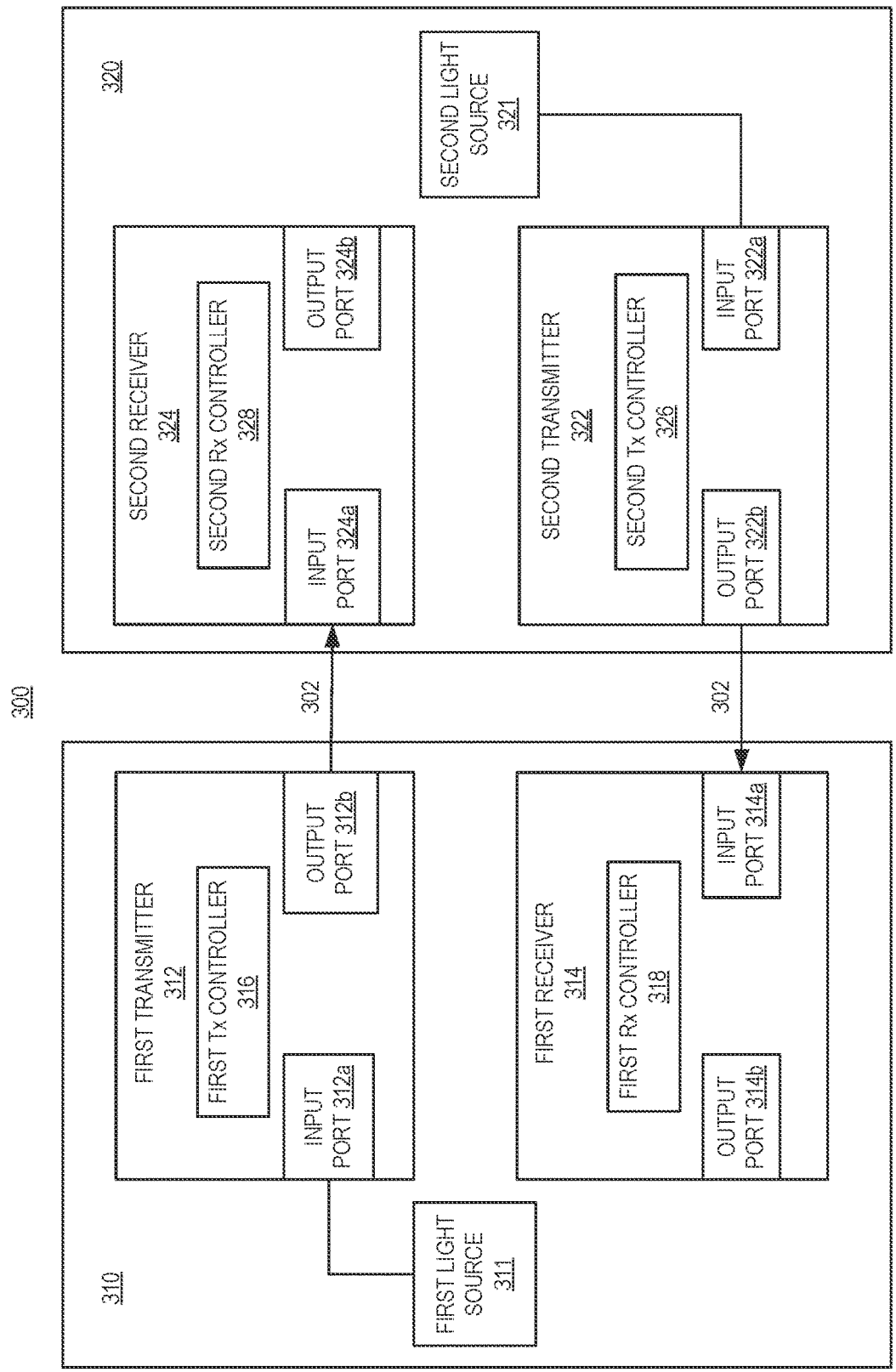
FIG. 3 is a block diagram of an optical communication system, in accordance with an example.

FIG. 3 depicts an optical communication system 300, in an example. The optical communication system 300 may include a first transceiver module 310 and a second transceiver module 320. It should be understood that although two transceiver modules are illustrated in FIG. 3, more transceiver modules can be included in the optical communication system 300. The first transceiver module 310 and the second transceiver module 320 may be connected through an optical communication medium 302 (e.g., optical fiber, waveguide, etc.).

The first transceiver module 310 may include a first transmitter 312 and a first receiver 314. The second transceiver module 320 may include a second transmitter 322 and a second receiver 324. In the examples described herein, the first transmitter 312 and the second transmitter 322 may be analogous to the transmitter 200 of FIG. 2A and the first receiver 314 and the second receiver 324 may be analogous to the receiver 250 of FIG. 2B.

In the first transceiver module 310, the first transmitter 312 may include an input port 312a (also referred to as a Tx input 312a), an output port 312b (also referred to as a Tx output 312b), and a pass-through output port (not shown). The first transmitter 312 may be optically coupled to a first light source 311 at the Tx input 312a. The first light source 311 may be analogous to the light source 102 of FIG. 1A or light source 202 of FIG. 2A, in some examples. The Tx input 110a may receive a multi-frequency optical signal emitted by the first light source 311. The first transmitter 312 may include a first Tx controller 316 which may be analogous to the Tx controller 240 of FIG. 2A. In some examples, the first Tx controller 316 may perform various functionalities as described herein to encode an output optical signal of the first transmitter 312 with data to be transmitted to generate an outgoing data stream of the first transmitter 312. In certain examples, the first Tx controller 316 may encode the output optical signal with the data in a similar fashion as described previously with respect to FIG. 2A. The outgoing data stream may be transmitted by the first transmitter 312 via the Tx output 312b to a destination, for example, the second receiver 324 at the second transceiver module 320.

The first receiver 314 may include an input port 314a (Rx input 314a) and an output port 314b (Rx output 314b). The Rx input 314a may receive an incoming data stream that may include an outgoing data stream from an external source (e.g., the second transmitter 322 at the second transceiver module 320). Upon receiving the incoming data stream, the first receiver 314 may generate multiple electrical signals including different frequencies (i.e., heterodyne combinations) based on the optical signal received via the incoming data stream as described previously with respect to FIG. 2B. The first receiver 314 may include a first Rx controller 318 (analogous to the Rx controller 260 of FIG. 2) that receives the electrical signals. In some examples, the first Rx controller 318 may perform various functionalities as described herein to decode the electrical signals to recover the data.

In the second transceiver module 320, the second transmitter 322 may include an input port 322a (Tx input 322a), an output port 322b (Tx output 322b), and a pass-through output port (not shown). The second transmitter 322 may be optically coupled to a second light source 321 at the Tx input 322a. The second light source 321 may be analogous to the light source 102 of FIG. 1A or the light source 202 of FIG. 2A. In an example, the Tx input 322a may receive a multi-frequency optical signal emitted by the second light source 321. The second transmitter 322 may include a second Tx controller 326, which may be analogous to the Tx controller 240 of FIG. 2A. In some examples, the second Tx controller 326 may perform various functionalities as described herein to encode an output optical signal of the second transmitter 322 with data to be transmitted to generate an outgoing data stream of the second transmitter 322. In certain examples, the second Tx controller 326 may encode the data to the outgoing data stream including one or more output optical signals of the second transmitter 322 in a similar fashion as described previously with respect to FIG. 2A. In some examples, the second Tx controller 326 may perform various functionalities as described herein to encode the data to the outgoing data stream of the second transmitter 322. The outgoing data stream may be transmitted by the second transmitter 322 via the Tx output 322b to a destination, for example, the first receiver 314 at the first transceiver module 310.

The second receiver 324 may include an input port 324a (also referred to as an Rx input 324a) and an output port 324b (also referred to as an Rx output 324b). The Rx input 324a may receive an incoming data stream that may include an outgoing data stream from an external source (e.g., the first transmitter 312 at the first transceiver module 310). Upon receiving the incoming data stream, the second receiver 324 may generate electrical signals including different frequencies (i.e., heterodyne combinations) based on the optical signal received via the incoming data stream, as described previously with respect to FIG. 2B. The second receiver 324 may include a second Rx controller 328 (analogous to the Rx controller 260 of FIG. 2B) that receives the electrical signals. In some examples, the second Rx controller 328 may perform various functionalities as described herein to decode the electrical signals to recover the data.

The functions of the components of the first transmitter 312 and the second transmitter 322 are similar to corresponding components of the transmitter 200 of FIG. 2A and the functions of the components of the first receiver 314 and the second receiver 324 are similar to corresponding components of the receiver 250 of FIG. 2B, as described above. While the techniques are described herein from the perspective of the transmitter 200 of FIG. 2A, it should be understood that the techniques can be applied to a transmitter of any transceiver module in the optical communication system 300, including the first transceiver module 310 and the second transceiver module 320. Similarly, while the techniques are described herein from the perspective of the receiver 250 of FIG. 2B, it should be understood that the techniques can be applied to a receiver of any transceiver module in the optical communication system 300, including the first transceiver module 310 and the second transceiver module 320.

Figure 4:
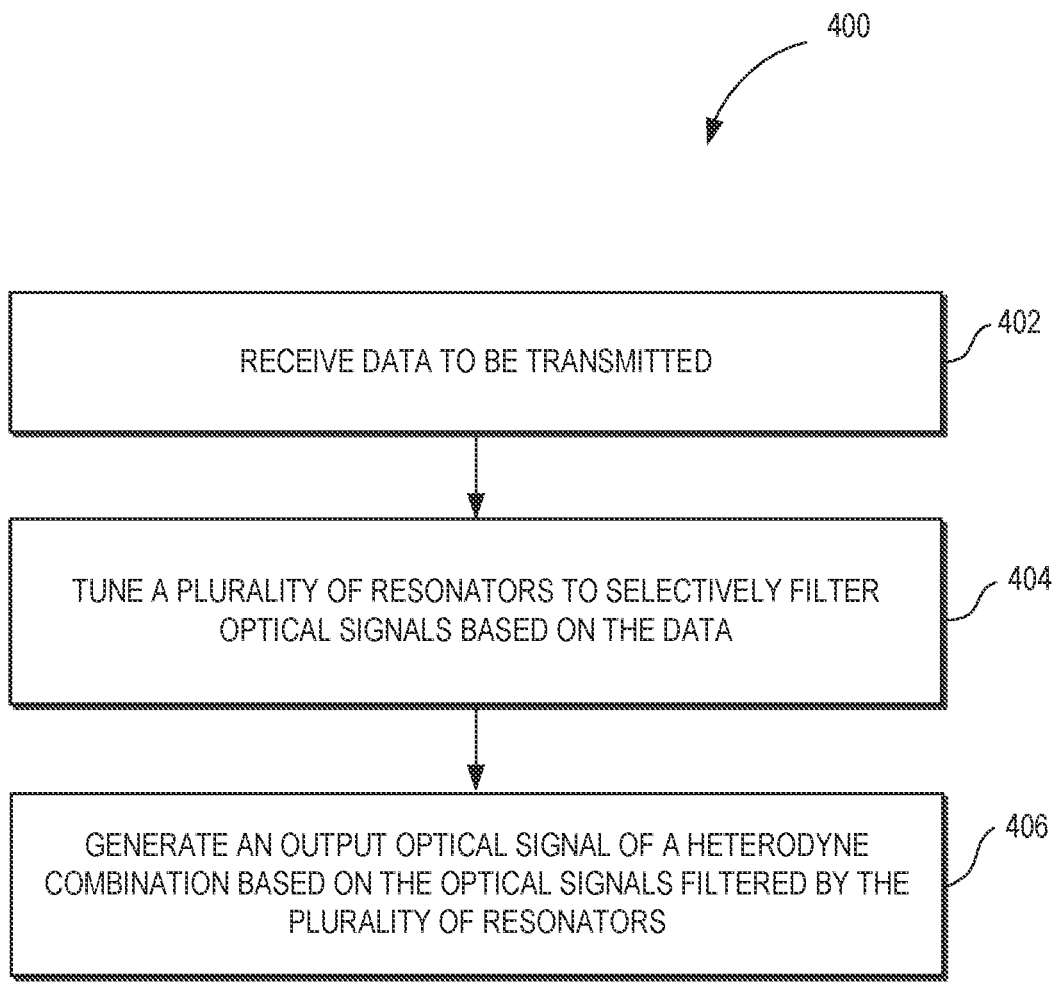
FIG. 4 is a flowchart of a method for transmitting optical signals encoded with data, in accordance with an example.

FIG. 4 depicts a flowchart illustrating a method 400 for transmitting data, in some examples. The method 400 can be performed by a transmitter (e.g., the transmitter 200 of FIG. 2A). Although the flowchart of FIG. 4 shows a specific order of performance of certain functionalities, the method 400 is not limited to such order. For example, the functionalities shown in succession in the flowchart may be performed in a different order, may be executed concurrently or with partial concurrence, or a combination thereof.

At block 402, the transmitter 200 may receive data to be transmitted. At block 404, the transmitter 200 may tune, individually, the plurality of resonators 220 to selectively filter optical signals of respective frequencies, based on the data. In some examples, the resonators 220 may be tuned to filter or not to filter the optical signals of respective frequencies by setting the temperature of the resonators 220, as described above. In some examples, the resonators 220 may be tuned to generate a character code (described above) based on the data. In some examples, at least two of the resonators 220 may be tuned to filter the optical signals of respective frequencies. At block 406, the transmitter 200 may generate an output optical signal including a heterodyne combination (described above) based on the optical signals received from the resonators 120. In some examples, the transmitter 200 may generate an output optical signal including a heterodyne combination based on the optical signals received from the resonators 220. In some examples, the transmitter 200 may generate an output optical signal including multiple heterodyne combinations based on the data. The resonators 220 may be tuned to encode the output optical signal with the data. In some examples, the transmitter 200 may transmit the output optical signal encoded with data (e.g., in form of an outgoing data stream) to a destination (e.g., the receiver 250 of FIG. 2B).

The receiver 250 may receive the output optical signal encoded with data at the photodetector 152, which may generate a photocurrent in response to receiving the output optical signal. The receiver 250 may convert the photocurrent, using the electronic circuit 254, to one or more electrical signals and decode the electrical signal(s) to recover the data. In situations where the receiver 250 receives an output optical signal including multiple heterodyne combinations, the receiver 250 may generate separate electrical signals including different heterodyne combinations of the multiple heterodyne combinations.

As used herein, "processing resource" may include a processor and a machine-readable storage medium communicatively coupled to the processor. The processor may be a central processing unit (CPU), microprocessor, or processing logic that interprets and executes machine-readable instructions stored in the machine-readable storage medium.

As used herein, "machine-readable storage medium" may be any electronic, magnetic, optical, or other physical storage apparatus to contain or store information such as executable instructions, data, and the like. For example, the machine-readable storage medium may be a random access memory (RAM) or another type of dynamic storage device that may store information and machine-readable instructions that may be executed by the processor. For example, the machine-readable storage medium may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, the machine-readable storage medium may be a non-transitory machine-readable medium.

The terminology used herein is for the purpose of describing example embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening element, unless otherwise indicated. Two elements may be coupled optically, mechanically, electrically, or communicatively linked through a communication channel, medium, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but is not limited to, the term "including" means including but not limited to. The presence of broadening words and phrases such as "one or more," "at least," "but not limited to" or other like phrases in some instances shall not be read to mean that the narrower case is intended or required in instances where such broadening phrases may be absent.

The foregoing description of various examples has been presented for purposes of illustration and description. The foregoing description is not intended to be exhaustive or limited to the examples disclosed, and modifications and variations are possible in light of the above teachings or may be acquired from the practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

The invention claimed is:

1. A transmitter comprising:
a waveguide to receive a multi-frequency optical signal;
a plurality of resonators optically coupled to the waveguide, wherein each resonator of the plurality of resonators selectively filters an optical signal of a frequency; and
an optical combiner coupled to the plurality of resonators to receive optical signals filtered by the plurality of resonators and generate an output optical signal comprising a heterodyne combination based on optical signals received from the plurality of resonators.

2. The transmitter of claim 1, wherein each of the plurality of resonators comprises a ring resonator.

3. The transmitter of claim 1, wherein the resonators of the plurality of resonators selectively filter optical signals of different frequencies.

4. The transmitter of claim 1, wherein the output optical signal comprises multiple heterodyne combinations based on the optical signals received from the plurality of resonators.

5. The transmitter of claim 1, further comprising:
a controller configured to:
receive data to be transmitted; and
tune the plurality of resonators to encode the output optical signal with the data.

6. The transmitter of claim 1, wherein the optical combiner comprises an optical directional coupler.

7. An optical communication system comprising:
a transmitter comprising:
a waveguide to receive a multi-frequency optical signal;
a plurality of resonators coupled to the waveguide, wherein each resonator of the plurality of resonators selectively filters an optical signal of a frequency; and
an optical combiner coupled to the plurality of resonators to receive optical signals filtered by the plurality of resonators and generate an output optical signal comprising heterodyne combinations based on optical signals received from the plurality of resonators; and a receiver coupled to the transmitter, the receiver comprising:
a photodetector to receive the output optical signal from the transmitter and generate an electrical signal comprising the heterodyne combinations; and
an electronic circuit to receive the electrical signal from the photodetector and generate electrical signals, each comprising a heterodyne combination of the heterodyne combinations.

8. The optical communication system of claim 7, wherein each of the plurality of resonators comprises a ring resonator.

9. The optical communication system of claim 7, wherein the resonators of the plurality of resonators selectively filter the optical signals of different frequencies.

10. The optical communication system of claim 7, wherein the optical combiner comprises an optical directional coupler.

11. The optical communication system of claim 7, wherein the transmitter further comprises a first controller configured to:
receive data to be transmitted; and
tune the plurality of resonators to encode the output optical signal with the data.

12. The optical communication system of claim 7, wherein the receiver comprises a second controller to receive the electrical signals from the electronic circuit and decode the electrical signals to recover the data.

13. A method comprising:
receiving, by a transmitter, data to be transmitted;
based on the data, tuning, by the transmitter, a plurality of resonators to selectively filter, from each of the resonators, an optical signal of a frequency from a multi-frequency optical signal; and
generating, by the transmitter, an output optical signal comprising heterodyne combinations based on the optical signals received from the plurality of resonators.

14. The method of claim 13, wherein each of the plurality of resonators comprises a ring resonator.

15. The method of claim 13, wherein tuning comprises setting a temperature of each of the plurality of resonators to selectively filter the optical signal.

16. The method of claim 13, wherein tuning comprises encoding the output optical signal with the data.

17. The method of claim 13, further comprising:
receiving, by a receiver, the output optical signal;
generating, by the receiver, an electrical signal in response to receiving the output optical signal; and
decoding, by the receiver, the electrical signal to recover the data.

* * * * *